United States Patent
Gharpure et al.

(10) Patent No.: US 9,875,671 B2
(45) Date of Patent: Jan. 23, 2018

(54) CLOUD-BASED USER INTERFACE AUGMENTATION

(75) Inventors: Chaitanya Gharpure, Mountain View, CA (US); Charles L Chen, San Jose, CA (US); Rachel Shearer, San Francisco, CA (US); Tiruvilwamalai V. Raman, San Jose, CA (US)

(73) Assignee: Google LLC, Mountain View, CA (US)

( * ) Notice: Subject to any disclaimer, the term of this patent is extended or adjusted under 35 U.S.C. 154(b) by 1517 days.

(21) Appl. No.: 12/640,938

(22) Filed: Dec. 17, 2009

(65) Prior Publication Data

US 2011/0154212 A1   Jun. 23, 2011

(51) Int. Cl.
*G09B 21/00* (2006.01)
*G06F 17/30* (2006.01)

(52) U.S. Cl.
CPC ..... *G09B 21/009* (2013.01); *G06F 17/30867* (2013.01); *G09B 21/00* (2013.01)

(58) Field of Classification Search
CPC .. G09B 21/009; G09B 21/00; G06F 17/30867
USPC ........... 709/200–226; 715/760, 60, 771, 781, 715/235, 716; 707/1, 506, 104, 513
See application file for complete search history.

(56) References Cited

U.S. PATENT DOCUMENTS 6,289,312 B1    9/2001  Raman
6,532,446 B1 *  3/2003  King ........................ 704/270.1
7,107,548 B2 *  9/2006  Shafron ................ G06F 9/4443
                                                707/E17.119
7,185,333 B1 *  2/2007  Shafron ................ G06F 9/4448
                                                715/744

(Continued)

OTHER PUBLICATIONS

Bigham, "Addressing performance and security in a screen reading web application that enables accessibility anywhere," Web Engineering, ICWE '08. Eighth International Conference on IEEE, Jul. 2008.*

(Continued)

*Primary Examiner* — Nicholas Taylor
*Assistant Examiner* — Chong G Kim
(74) *Attorney, Agent, or Firm* — Brake Hughes Bellermann LLP

(57) ABSTRACT

Method for providing augmented user interface (AUI). AUI is provided in response to a request. AUI configuration information is received, stored in preference file, and sent to remote server. Remote server receives request from computer to login user. Remote server authenticates user, retrieves and sends preference file to computer. Preference file contains information that allows computer to implement and configure AUI by directing output to AUI component. Remote server sends computer web-based API to enable browser to interface with an AUI application. API can include target callable by event handler to respond to HTML document browsing event by invoking AUI application. Remote server can send computer web-based, native, or browser plug-in AUI application. Computer can provide content rich navigation via API, AUI application and content navigation rules that define plural navigation paths through HTML document. Navigation paths providing AUI functionality to particular type of special needs user or user task.

12 Claims, 5 Drawing Sheets

(56) References Cited

U.S. PATENT DOCUMENTS

| | | | |
|---|---|---|---|
| 7,559,034 B1* | 7/2009 | Paperny | G06F 9/44526 345/629 |
| 2002/0033844 A1* | 3/2002 | Levy | G06F 21/10 715/744 |
| 2002/0065658 A1* | 5/2002 | Kanevsky | G06F 17/30902 704/260 |
| 2002/0138616 A1* | 9/2002 | Basson | G06Q 20/123 709/225 |
| 2002/0194219 A1* | 12/2002 | Bradley et al. | 707/506 |
| 2004/0205651 A1* | 10/2004 | Dutta | G06F 17/30882 715/255 |
| 2005/0160065 A1* | 7/2005 | Seeman | 707/1 |
| 2006/0107217 A1* | 5/2006 | Lu | G06F 17/30861 715/733 |
| 2006/0136843 A1* | 6/2006 | Shafron | G06F 9/4443 715/826 |
| 2006/0150110 A1* | 7/2006 | Dietl | G06F 17/30899 715/760 |
| 2007/0162524 A1* | 7/2007 | Coe | G06F 17/30876 |
| 2007/0266342 A1* | 11/2007 | Chang | G06F 17/30867 715/810 |
| 2007/0282885 A1* | 12/2007 | Baude | G06F 8/38 |
| 2008/0022267 A1* | 1/2008 | Johnson | G06F 8/38 717/143 |
| 2008/0097986 A1* | 4/2008 | Shih | G06F 17/30867 |
| 2008/0098058 A1* | 4/2008 | Shih | G06F 17/30867 709/201 |
| 2008/0168382 A1* | 7/2008 | Louch et al. | 715/781 |
| 2008/0184100 A1* | 7/2008 | Selig | G06F 17/243 715/225 |
| 2008/0222142 A1* | 9/2008 | O'Donnell | G06F 17/30867 |
| 2008/0307043 A1* | 12/2008 | Dorsey | G06F 9/4445 709/203 |
| 2009/0237328 A1 | 9/2009 | Gyorfi et al. | |
| 2010/0070872 A1* | 3/2010 | Trujillo | G06F 3/04892 715/745 |
| 2010/0077322 A1* | 3/2010 | Petro et al. | 715/760 |
| 2010/0090964 A1* | 4/2010 | Soo et al. | 345/173 |
| 2010/0122157 A1* | 5/2010 | Cepero Gonzalez | G06F 17/218 715/239 |
| 2010/0205523 A1* | 8/2010 | Lehota | G06F 17/30905 715/235 |
| 2011/0154212 A1 | 6/2011 | Gharpure et al. | |
| 2015/0205882 A1* | 7/2015 | Vukas | G06F 17/30256 707/758 |

OTHER PUBLICATIONS

Raman, "ChromeVox: A Screen Reader Built Using Web Technology," retrieved from a web site by Google (http://google-axs-chrome.googlecode.com/svn/trunk/developer/chromevox-overview-2012/paper.html), Apr. 2012.*

International Search Report for International Application No. PCT/US99/026825, dated Jun. 8, 2011, 9 pages.

"Writing AxsJAX Scripts", Jul. 3, 2008, retrieved from http://google-axsjax.googlecode.com/svn/trunk/docs/tutorial/tutorial.html, 15 pages.

"AxsJAX Frequently Asked Questions", Oct. 30, 2007, retrieved from http://google-asxjax.googlecode.com/svn/trunk/docs/faq.html, 4 pages.

"Where are the Downloads for AxsJAX?", Aug. 14, 2008, retrieved from http://google-axsjax.googlecode.com/files/downloads.html, 2 pages.

* cited by examiner

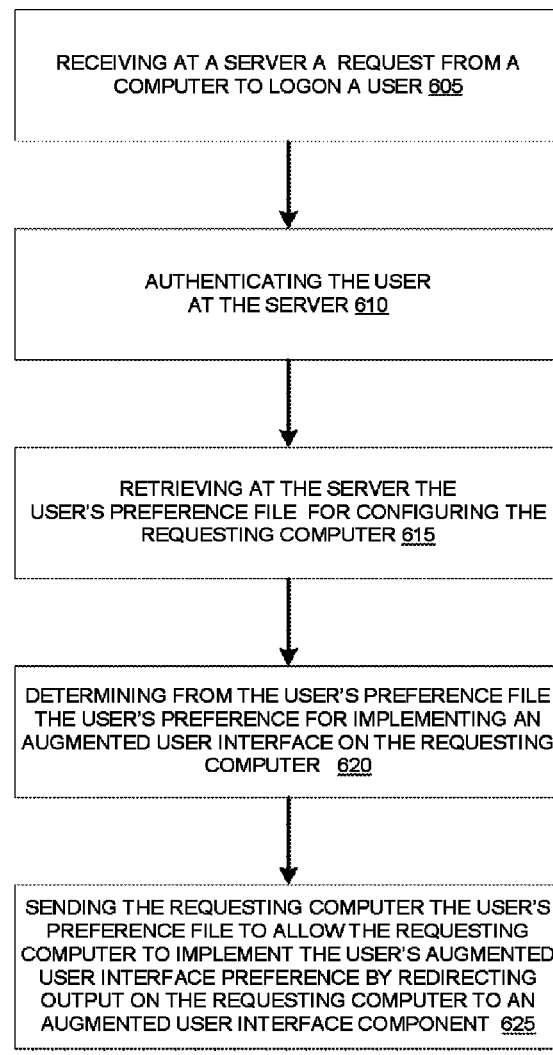

CLOUD-BASED USER INTERFACE AUGMENTATION

TECHNICAL FIELD

This application relates generally to computer implemented methods for providing augmented user interfaces for special needs users, and more particularly, to computer implemented methods for providing augmented user interfaces in a cloud-based computing environment.

BACKGROUND

With the creation of the world-wide-web and high speed computer networks, the paradigm for personal computer usage has shifted. In the past, users primarily used their personal computers to run programs, and to create, store and manipulate data that was located on their local hard-drive. Only rarely would a user store or manipulate data that was located on a networked drive, or run a program that was provided as a networked service, and even then, the programs and data were usually restricted to programs and data residing on local area networks. Today, more and more users are storing more and more of their data on remote data servers, and using remotely provided web-based applications (e.g., Software as a Service ("SaaS") programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets and Java Scripts), which can themselves be application programming interfaces ("API's") to more sophisticated applications that are running on remote servers. In the cloud computing paradigm, a web browser interfaces with and allows a user to control an application program that is running on a remote server. Through the browser, the user can create, edit, save and delete files on the remote server via the remote application program.

Due to this shift in computer usage, today's computer users are unlikely to want or need many of the bells and whistles provided by modern operating systems. They do not need to worry about file structures or organizing or backing up their data, because much of their data is stored, organized and backed up for them on the cloud. They do not need to worry about loading and updating software, such as augmented user interface software, because most of the software they use is provided to them when needed as a cloud-based service. Instead, today's computer users are more interested in quickly logging onto their computer, launching a web browser, and accessing data and programs of interest to them, which are accessible through the world wide web.

Cloud computing promises a user ubiquitous, any-time access to all of that user's information and applications. For users with special needs, e.g., blind users, this promise can only be realized by moving away from the current paradigm of installing special needs software such as augmented user interfaces on the user's personal computer to a cloud-based paradigm where the user's special needs software is provided over the network as a cloud-based service. Failing to do this would result in a significant proportion of the user-base missing out on the advantages of cloud computing.

SUMMARY

Computer-implemented methods and apparatus for providing a user with an augmented user interface. A computer can receive a user request for an augmented user interface. The computer can provide the user with the augmented user interface, and receive information from the user to configure the augmented user interface. The computer can store the configuration information for the augmented user interface in a preference file, and send the preference file to a remote server for storage.

A remote server can subsequently receive a request from a requesting computer to login a user. The remote server can authenticate the user, retrieve the user preference file from a database record, and send the requesting computer the user preference file. The user preference file can record the user's preference for configuring the requesting computer, and contain information that allows the requesting computer to implement and configure an augmented user interface (AUI) by directing output on the requesting computer to an augmented user interface component that processes the output to provide the AUI to the user.

Features and advantages of the disclosed method include one or more of the following. The user request for an augmented user interface can be received from a keyboard, a pointing device, or an audio input device. The remote server can send the requesting computer a web-based application programming interface that enables a browser running on the requesting computer to interface with an augmented user interface application. The remote server can also send the requesting computer an augmented user interface (AUI) application. The augmented user interface application can be a web-based application that runs on a network based server, a native application that runs on the requesting computer, or a browser plug-in that runs in a browser on the requesting computer. The application programming interface can include a target that is callable by an event handler that is configured to respond to an event generated while browsing an HTML document, and to invoke an augmented user interface application in response to the event to provide a user with augmented user interface functionality.

The requesting computer can provide content rich navigation through a web page via the augmented user interface. The requesting computer can receive at an application programming interface running in a web browser a call from an event handler to process a detected user navigation event, and can process the call to invoke an augmented user interface application to respond to the detected user navigation event. The detected user navigation event can be generated based on a web page's content, including user navigation through a table in the web page, a web page's HTML5 document outline, or on a content navigation rule in the web page or a document associated with the web page.

The content navigation rule can provide a navigation path through the web page that is tailored to provide augmented user interface functionality to a particular type of special needs user, and can provide a plurality of content navigation rules that define a plurality of navigation paths through the web page, wherein each navigation path is tailored to provide augmented user interface functionality to a particular type of special needs user or to a particular type of user task.

BRIEF DESCRIPTION OF THE DRAWINGS

FIG. 6 is a flow chart of a process for providing a special needs user cloud-enabled access to an augmented user interface.

DETAILED DESCRIPTION

The transition from a traditional personal computing paradigm to a cloud-based computing paradigm offers several advantages. For example, the cloud-based paradigm can free the user from being needlessly tethered to his or her own computer by storing not only the user's files and the application programs needed to manipulate those files on a cloud-based server, but by also storing the user's computer preferences on a cloud-based server. The user's computer preferences can include, for example, the user's keyboard settings, short-cut keys, mouse or pointer settings, display settings, font sizes, and audio settings. In the case of special needs users, the user's computer preferences can also include local computer settings that can be used by the local computer to invoke any augmented user interfaces ("AUI") the user relies upon to increase the user's effective use of the computer. Augmented user interfaces can include, for example, interfaces that provide video captions for hearing impaired users, screen readers or screen magnifiers for visually impaired users, and voice recognition software for recognizing input from physically impaired users.

In the traditional computing paradigm, a special needs user generally needs to install AUI software on any computer the user wishes to use or find a computer which already has such software installed. For example, a user who wants to use a computer at an Internet Café or kiosk would need to either find a computer that already has the AUI software installed, or one that would allow the user to install the software. Of course, for security reasons, most publically accessible computers would not permit the user to install any software, including AUI software. And if no AUI software is installed on the computer, the computer owner probably does not have any such software to install. Moreover, even if a user were permitted to install the user's own AUI software, the user's license agreement with the AUI software vendor would probably prohibit installation on a publicly accessible computer.

By contrast, in a cloud-computing paradigm, a special needs user can store his or her AUI settings in a preference file that is stored on a remote cloud based server. The preference file can be downloaded from the remote server to any computer the user logs onto that is configured for cloud-enabled computing, such as a computer that is configured to run the Chrome-OS operating system available from Google, Inc. When a user logs onto a computer configured for cloud-enabled computing, the user's preference file is downloaded to the local computer together with any AUI components that are needed to satisfy the user's AUI preferences as specified in the preference file. In this way, the user can enjoy the same AUI enhanced user experience regardless of whether the user logs onto his or her computer at home, a friend's computer, or a publically accessible computer at a library or Internet Café.

Figure 1:
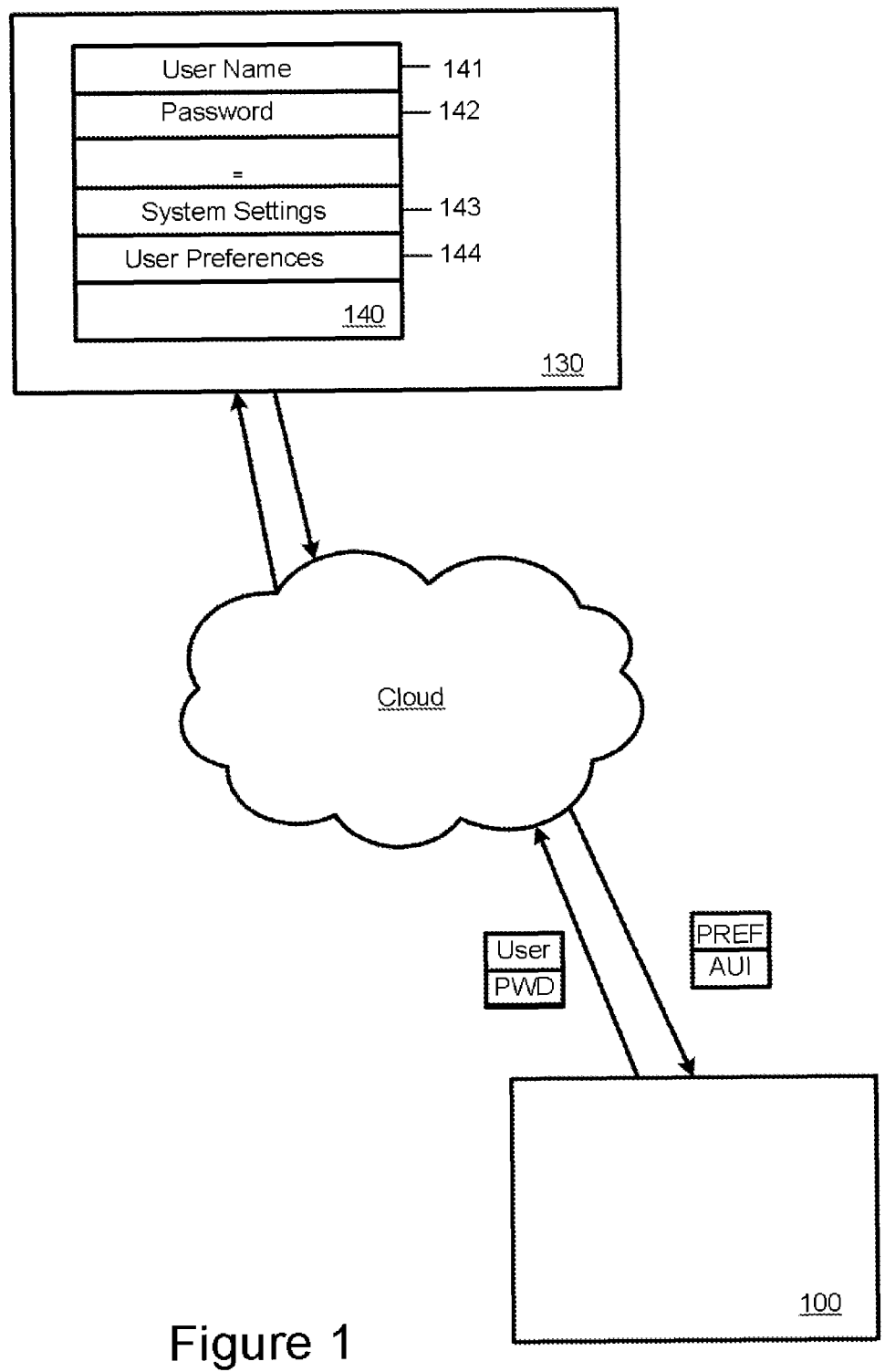
FIG. 1 is a schematic diagram illustrating information exchange between a cloud-enabled computer and a cloud-based server offering a cloud-based service.

FIG. 1 is a schematic diagram illustrating information exchange between a cloud-enabled local computer 100 and a remote server 130 offering a cloud-based service. In one implementation, a user logs onto local computer 100 by supplying authentication credentials, such as a username and password. After authenticating the user, the local computer 100 can send the authentication credentials to the remote server 130. The remote server 130 can then use the credentials to grant or deny the user's access to one or more cloud-based services or accounts. To aid special needs users, local computer 100 can be configured to recognize certain user input as an indicator that the user is a special needs user. For example, local computer 100 can be configured to recognize the input of a special key or special key sequence as an indicator that the user is a special needs user. Local computer 100 can also be configured to recognize certain verbal commands, such as "log in" or "log on," as indicators to recognize users who may be physically impaired or otherwise unable to use a keyboard to enter the special key or special key sequence. Of course, other indicators are also possible.

In response to receiving input indicating a special needs user, local computer 100 can launch an enhanced feedback package to assist the user with the login process. The enhanced feedback package can include various AUI components such as a screen magnifier, a speech reader, a speech recognizer and similar aids. Using these AUI components, the user can setup and configure local computer 100 according to the user's needs, and store these configuration settings for local computer 100 as preferences to enhance the user's computing experience. Among the configuration settings for local computer 100 the user can store are the user's preferences for installing, configuring, and/or using various AUI components. Local computer 100 can store the user's configuration preferences in a preference file 144, and in one implementation, can send the preference file 144 to a remote server 130 for permanent storage.

Remote server 130 generally includes a database 140 that stores information for a plurality of users, including but not limited to usernames 141, passwords 142, and system settings 143 and user preferences 144 for a local computer 100. In one implementation, remote server 130 is a single machine. However, remote server 130 can be two or more machines that are networked together to provide the functionality described. Remote server 130 can authenticate the credentials sent by local computer 100, e.g., by querying database 140 for the received username and verifying that the received username is related in database 140 to the password sent by local computer 100. If remote server 130 cannot authenticate the user's credentials, either because it cannot find the username in database 140 or because the password related to the username in database 140 does not match the password sent by local computer 100, remote server 130 can deny the user access to remote server 130 or to any cloud-based services provided by or through remote server 130. If, however, remote server 130 authenticates the user's credentials, it can send local computer 100 the user's preference file 144 (if one exists), including any preference for local computer 100 to install or use one or more augmented user interfaces, and the components needed by local computer 100 to install or use those interfaces.

Once a preference file 144 for a user has been created and stored on a remote server 130 as explained above, the user can log onto any cloud-enabled local computer and enjoy the same user experience the user enjoyed when he or she configured local computer 100, including local computer 100's access to and use of preferred AUI components. This occurs, as explained above, because any cloud-enabled local computer 100 the user logs onto will automatically try to authenticate the user with the remote server 130. If the remote server 130 authenticates the user, it can automatically download the user's preference file 144 to the local computer the user logged onto, including the user's preferences for installing, configuring and/or using various AUI components on the local computer. In addition, the remote server 130 can download any AUI components for which the user has expressed a preference in preference file 144 if those components do not already exist on the local computer. When the local cloud-enabled computer receives the preference file 144 from the remote server 130, it applies the configuration information specified in the preference file 144 to itself by adjusting its local settings, including settings for font size, screen resolution, and the use of screen readers, speech synthesizers, and other AUI components. In this way, the user can enjoy the same AUI enhanced user experience regardless of whether the user logs onto his or her own computer at home, a friend's computer at a friend's house, or a publically available computer at a library or Internet Café.

In a local computer optimized for cloud-enabled computing, the primary application run by the local computer is a web browser. In one implementation, local cloud-enabled computer 100 automatically launches a web browser upon authenticating a user and granting the user access. Local computer 100 also grants the web browser access to system-level resources that are usually reserved for system-level applications. Such resources include, for example, account and user access rights, display setting and management rights, network setting and preference rights, media access rights, sound setting and management rights, and keyboard and mouse setting rights. The user can use the launched web browser to run web-based applications from a plurality of remote web servers. In one implementation, local computer 100 can allow a browser to run a web-based control panel application to allow a user to adjust system settings and user preferences on local computer 100, and can launch the control panel when a user first logs onto the computer.

Figure 2:
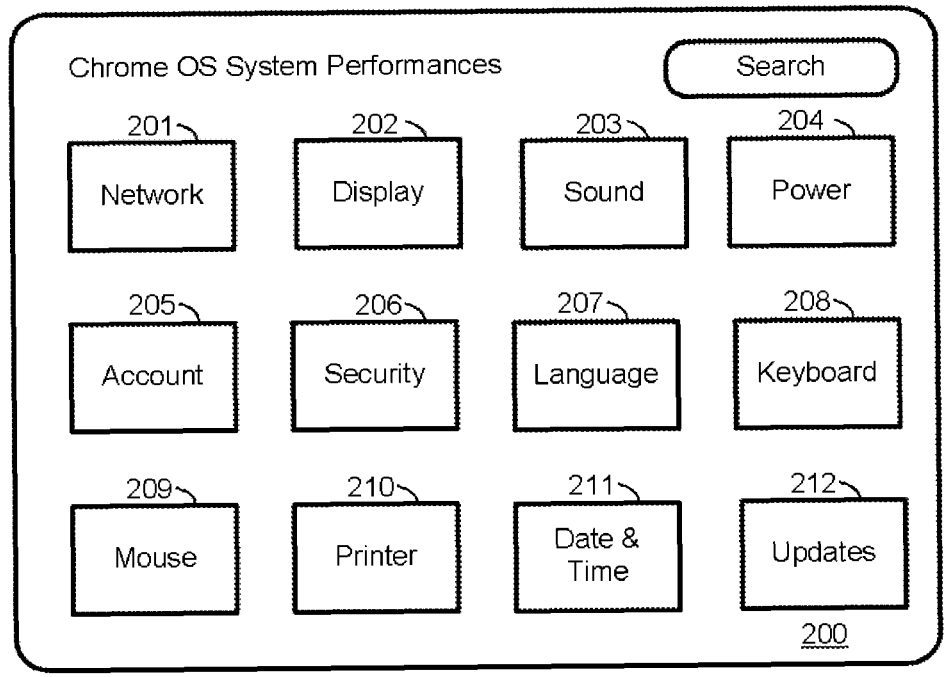
FIG. 2 is a schematic diagram illustrating a web application control panel that can be used to set system settings and user preferences in a cloud-enabled computer.

FIG. 2 is a schematic diagram illustrating a web application control panel 200 that can be used to set system settings and user preferences in a cloud-enabled computer. System settings refer to local computer settings that are specific to a particular computer, regardless of who is using that computer. Such settings include, for example, network connections and preferences, and user account and access rights. System settings can only be applied to a computer by the owner of the computer or by someone designated by the owner to apply system settings. User preferences refer to local computer settings that are specific to a particular user, regardless of which computer the user is logged onto. User preferences include, for example, keyboard and mouse settings, favorite applications and websites, and augmented user interface configurations and settings. In one implementation, control panel 200 is a web-based application, and computer 100 provides control panel 200 through a web browser. Computer 100 can store the system settings and user preferences selected through control panel 200 in a local file or database, or in a file or database that is stored on a remote server, such as database 140 on remote server 130. In one implementation the system settings and user preferences are stored in a remote file or database on a remote server.

As shown in FIG. 2, in one implementation, control panel 200 includes various control buttons such as Network 201, Display 202, Sound 203, Power 204, Accounts 205, Security 206, Language 207, Keyboard 208, Mouse 209, Printer 210, Date and Time 211 and Updates 212 control buttons. The Display 602 control button allows a user to set display settings on local computer 100 such as screen resolution and color management preferences. It can also be used to allow a user to configure local computer 100 to install or use AUI components that can assist a visually impaired user, e.g., by redirecting display output to an AUI component. For example, the Display 602 control button can be used to display extra large fonts on computer 100, or to install or launch a screen magnifier on computer 100. The screen magnifier can be a native application on computer 100, a browser plug-in, or a web-based application that is run on a web browser. All of these components can be downloaded from a remote server. The Sound 203 control button allows a user to setup and configure audio input and output devices on local computer 100. The Sound 203 control button can also be used to allow a user to configure local computer 100 to install and use AUI components that can assist a hearing impaired user, a visually impaired user, or a physically impaired user, e.g., by redirecting audio output to an AUI component such as a closed-captioning component or by receiving audio input through an AUI component such as a speech recognizer. For example, the Sound 203 control button can be used to configure computer 100 to provide closed-captioning for all video or audio files that are played on computer 100. The Sound 203 control button can also be used to configure computer 100 to redirect display output to a screen reader to aid a visually impaired user, or to receive audio input through a speech recognizer and translate that input into commands to aid a physically impaired user who may not be able to manipulate traditional input/output devices such as a keyboard, touchpad or mouse. As before, any of the closed-captioning, screen reading and speech recognizing applications that are used by local computer 100 can be native to computer 100, web browser plug-ins, or web-based applications, and can be downloaded to computer 100 from a remote server based on user preference file 144.

Of course, control panel 200 and the control buttons 202-212 shown in FIG. 2 are but one example of a user interface through which the user can select and configure system settings and user preferences. Other user interfaces and user interface tools can be provided that contain addition control buttons or different types of control tools. For example, control panel 200 can include an AUI button to directly indicate the user's preference for installing and configuring a plurality of AUI tools such as screen readers and screen magnifiers. Similarly, other types of control tools such as drop down lists, slider bars, text input fields and speech recognition applications can be used to record and save system settings and user preferences.

Figure 3:
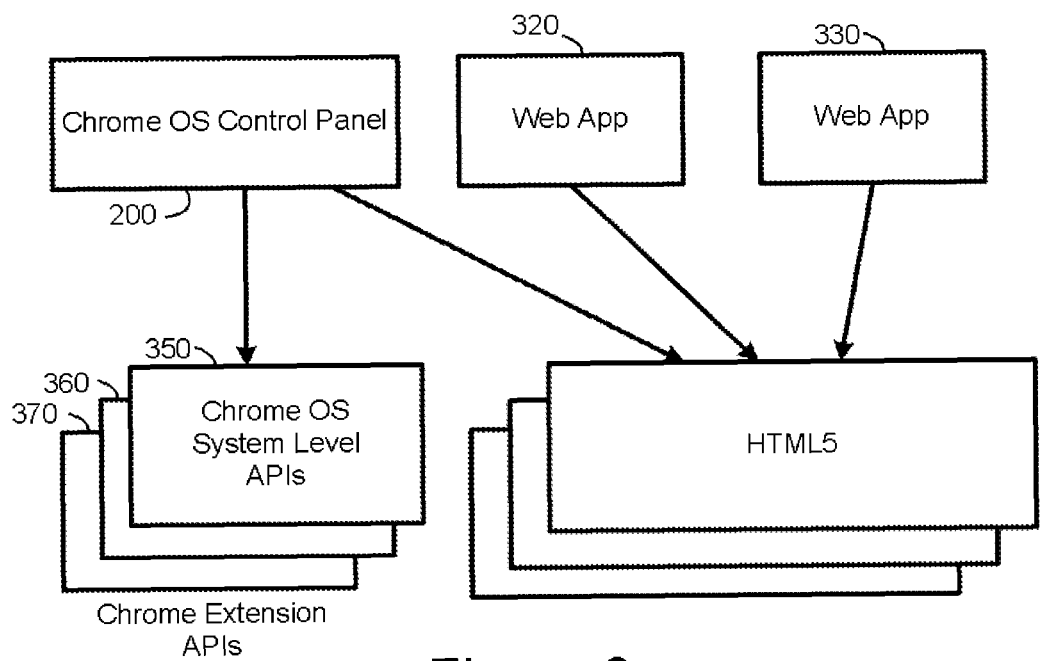
FIG. 3 is a schematic diagram illustrating an exemplary way a web application control panel can access system level resources on a cloud-enabled computer.

FIG. 3 is a schematic diagram illustrating an exemplary way a web application control panel can access system level resources on a cloud-enabled computer. As shown in FIG. 3, Control Panel 200 can access and control system-level resources of computer 100 through a plurality of system-level Application Programming Interfaces ("API") 350, 360 and 370. API's 350-370 allow Control Panel 200 to access system-level resources of computer 100 in order to configure computer 100 according to the preference file 144 downloaded from a remote server 130. In one implementation, Control Panel 200 is a web-based application that can be written in Hyper Text Markup Language, version 5, or HTML5 and JavaScript. The web-based applications that are run on and through a browser running on computer 100, such as Web Apps 320 and 330, are preferably written in the same language.

As discussed above, when a user logs onto a cloud-enabled local computer 100, the local computer automatically tries to log the user onto a cloud based service provided by or through a remote cloud-based server 130. If the remote server 130 authenticates the user, it downloads to local computer 100 the user's preferences file 144 and any other files computer 100 needs to configure itself according to the user's preferences, e.g., by setting display or audio settings or redirecting output to an AUI component. In the case of a special needs user, this can include downloading to computer 100 the AUI's needed to enhance the user's computing experience. The AUI's can be downloaded in the form of stand alone applications, browser plug-ins, API interfaces for web-based AUI applications, or any combination of the same. In one implementation, remote server 130 downloads an API plug-in that allows computer 100 to configure a web browser running on computer 100 to provide AUI functionality to a special needs user regardless of the nature of the AUI application (e.g., whether cloud-based, native or a browser plug-in). Computer 100 can use the preference file 144 downloaded from remote server 130 to change its local settings per the information stored in the preferences file 144. If the preference file indicates a user's preference for using one or more AUI components, computer 100 can install and activate those AUI components so they can be used by computer 100 or software running on computer 100. For example, computer 100 can install and activate a screen reader AUI component by redirecting display output to an audio card or device.

Figure 4:
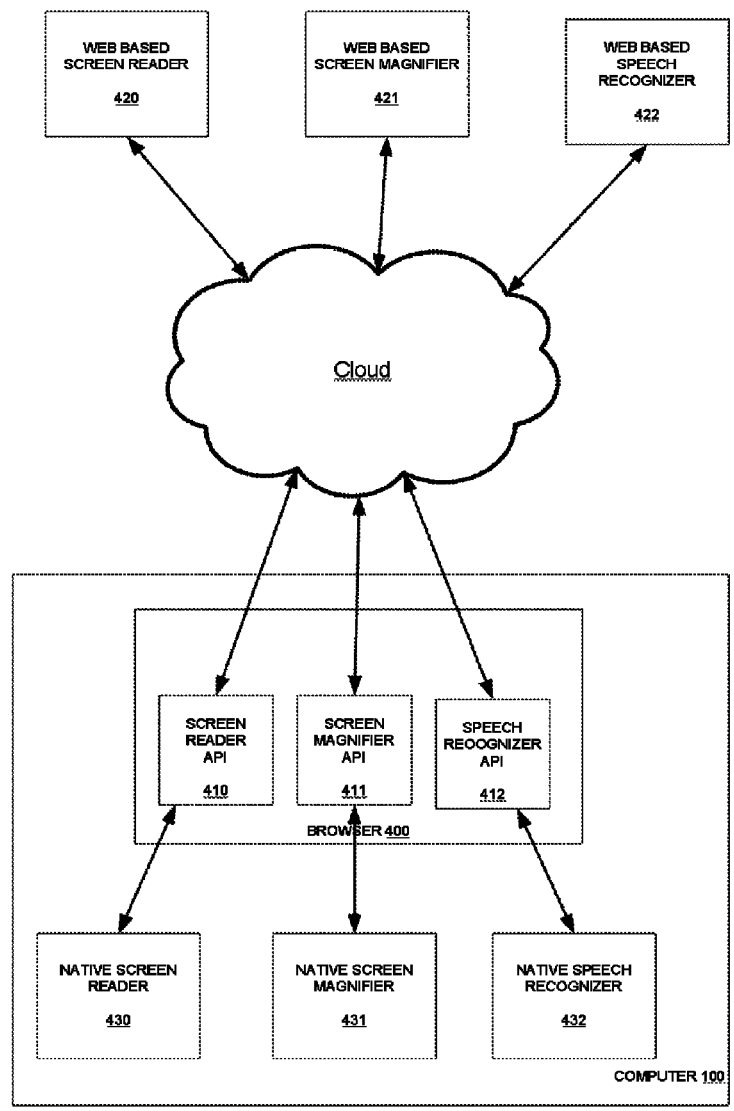
FIG. 4 is a schematic diagram illustrating the use of API plug-ins in a web browser to provide AUI functionality to a special needs user.

FIG. 4 is a schematic diagram illustrating the use of API plug-ins in a web browser to provide AUI functionality to a special needs user. As shown in FIG. 4, a web browser 400 running on a cloud-enabled computer 100 can include API plug-ins 410-412. The API plug-ins can be downloaded from a remote server 130 to a local cloud-enabled computer 100 according to a user's preference file 144, and installed by computer 100 to provide a standard interface that allows browser 400 to provide a special needs user with AUI functionality regardless of the nature or location of the user's preferred AUI application. For example, screen reader API 410 allows browser 400 to provide screen reader functionality through a cloud-based screen reader 420, a screen reader 430 which is native to computer 100, or a screen reader plug-in for browser 400 (not shown). Screen magnifier API 411 allows browser 400 to provide screen magnifier functionality through a cloud based screen magnifier 421, a screen magnifier 431 that is native to computer 100, or a screen magnifier plug-in for browser 400 (not shown). Similarly, speech recognizer API 412 allows browser 400 to provide speech recognition functionality through a cloud based speech recognizer 422, a speech recognizer 432 that is native to computer 100, or a speech recognizer plug-in for browser 400 (not shown). Of course, other API's may be downloaded by remote server 130 to provide browser 400 functionality for other types of augmented user interfaces.

If the user's preference file 144, discussed above, indicates a preference to configure computer 100 to provide a screen reader AUI, a screen magnifier AUI, and a speech recognition AUI, API plug-ins 410-412 can be automatically downloaded from remote server 130 when the user logs onto computer 100. Remote server 130 can also download the native screen reader 430, native screen magnifier 431, native speech recognizer 432 or browser plug-in versions of a screen reader, screen magnifier or speech recognizer (not shown) if they do not already exist on computer 100. The user's preference file 144 can also store the user's preference for using one or more of these applications, e.g., a preference for using web based screen reader 420 rather than native screen reader 430, or for using native screen magnifier 431 rather than web based screen magnifier 421, or for using a plug-in based speech recognizer (not shown) rather than a web based speech recognizer 422 or a native speech recognizer 432. The computer 100 can configure itself to apply the preferences specified in preference file 144, e.g., by changing its system settings or by redirecting audio, video or textual output to an appropriate AUI component such as a speech recognizer or screen reader as indicated in the preference file 144.

In addition to providing basic AUI functionality, the API's 410-412 can be used by computer 100 to provide content rich functionality that allows a special needs user to quickly determine the content, structure and navigability of web pages based on information in the web page's document object model (DOM). For non-special needs users, the content and structure of a web page is generally easily recognizable. For example, a web page delivered by a news organization can have a breaking news story at the top of the page, followed by several columns of news stories at the bottom of the page, each of which contains a plurality of news stories in different news categories (e.g., local, national, international, sports, entertainment, and editorial). While the structure of such a news page can be easily recognized by a sighted user and exploited to quickly identify and navigate to articles of interest, this structure would be largely unrecognizable and unavailable to a blind user using a basic screen reader. Such a user, upon opening the news page, would hear a seemingly non-ending stream of words with little or no information to reveal the page's overall content, structure and navigability, which are so obvious to a sighted user.

Fortunately, the rich content and structure of a web page and the ability to exploit that rich content and structure is available to the web browser 400 and ultimately to a special needs user through the web page's DOM, event observers and event handlers. The web page's DOM provides the logical structure of all of the objects that make up the web page, and how those objects relate to one another as elements on the page. An event observer can detect when a user interacts with an object on a web page, and can call an event handler to process a response to the event. For example, when an event observer detects the selection of an object on a page, it can notify an event handler, which can cause that object to be highlighted on the page. For visually impaired users, the event handler can also send the title or content of the selected object to a screen reader or to an API for a screen reader so that it can be read aloud to the user, or to a screen magnifier or an API for a screen magnifier so that it can be magnified on the user's display.

A web page's DOM allows different views into the structure and content of the web page to be built. These views can be exploited to allow different navigation paths through the page. For example, web pages can be navigated by content traversal, logical structure traversal, complex table traversal, and semantic traversal. Content traversal allows a web page to be navigated based on page content, e.g., by character, word, sentence, paragraph, section, chapter, title, etc. Logical structure traversal allows a web page written in language that specifies a logical structure to be navigated based on its structure or document outline. For example, for a web page written in a language that includes a DOM and that allows a browser to programmatically access the Document Object Model (DOM) (e.g., HTML5), logical structure traversal allows the page to be navigated based on its DOM or document outline. Complex table traversal allows tables in a web page to be navigated by rows, columns and cells. And semantic traversal allows a web page to be navigated based on content navigation rules that a web page developer can write into the page.

In general, a web page developer can use content navigation rules (CNR) to characterize the nodes of a web page's DOM as a sequence of one or more logical paths through the page. Each logical path can provide a different view into the page and its contents, and therefore a different navigation path. Thus, using content navigation rules, different navigational paths can be created through a web page to provide AUI functionality that is tailored for different types of special needs users. For example, one navigation path can be created to provide AUI functionality that is tailored to the needs of visually impaired users, while another navigation path can be created to provide AUI functionality that is tailored to the needs of hearing impaired users, and yet another to provide AUI functionality that is tailored to the needs of physically impaired users.

As explained above, a web page's content navigation rules can be used to determine how a user can navigate (e.g., using keyboard shortcuts or voice commands), through the objects in the web page's DOM. Using the news page example described above, a content navigation rule can specify that when the page is first loaded into a browser, the focus of the page is on the breaking news story at the top of the page. Another content navigation rule can specify that when the current focus is on the breaking news story at the top of the page or the first item in the first column of the other news stories at the bottom of the page, the user can navigate between the breaking news story at the top of the page and the first item in the first column at the bottom of the page using the up and down arrow keys. Thus, for example, when the focus is on the breaking news story and a user depresses the down arrow key, an event observer can detect the depression and signal an event handler to process the event. The event handler can change the focus from the breaking news story to the first story in the first column at the bottom of the page. For visually impaired users, the event handler can also send the title of that story to a screen reader or to an API for a screen reader so that it can be read aloud to the user.

When the focus is on any item in the first column of news stories, a content navigation rule can allow a user to navigate through the other items in the first column by depressing the up or down arrow keys. Yet another content navigation rule can allow a user to navigate to the first item in the other columns by depressing the right arrow key. Again, event observers can detect the depression of the up, down or right arrow keys, and signal the appropriate event handlers to respond to these events. The event handlers can respond by changing the focus of the page to the appropriate item (e.g., the first article in the next column in response to depression of the right arrow key), and in the case of a visually impaired user, by sending the title of the object that receives the focus to a screen reader or to an API for a screen reader so that it can be read aloud to the user. A web page's content navigation rules can be embedded in the web page itself or in a browser plug-in that gets downloaded with the page and that can be interpreted by other browser plug-ins such as the AxsJax plug-in available from Google, Inc.

Figure 5:
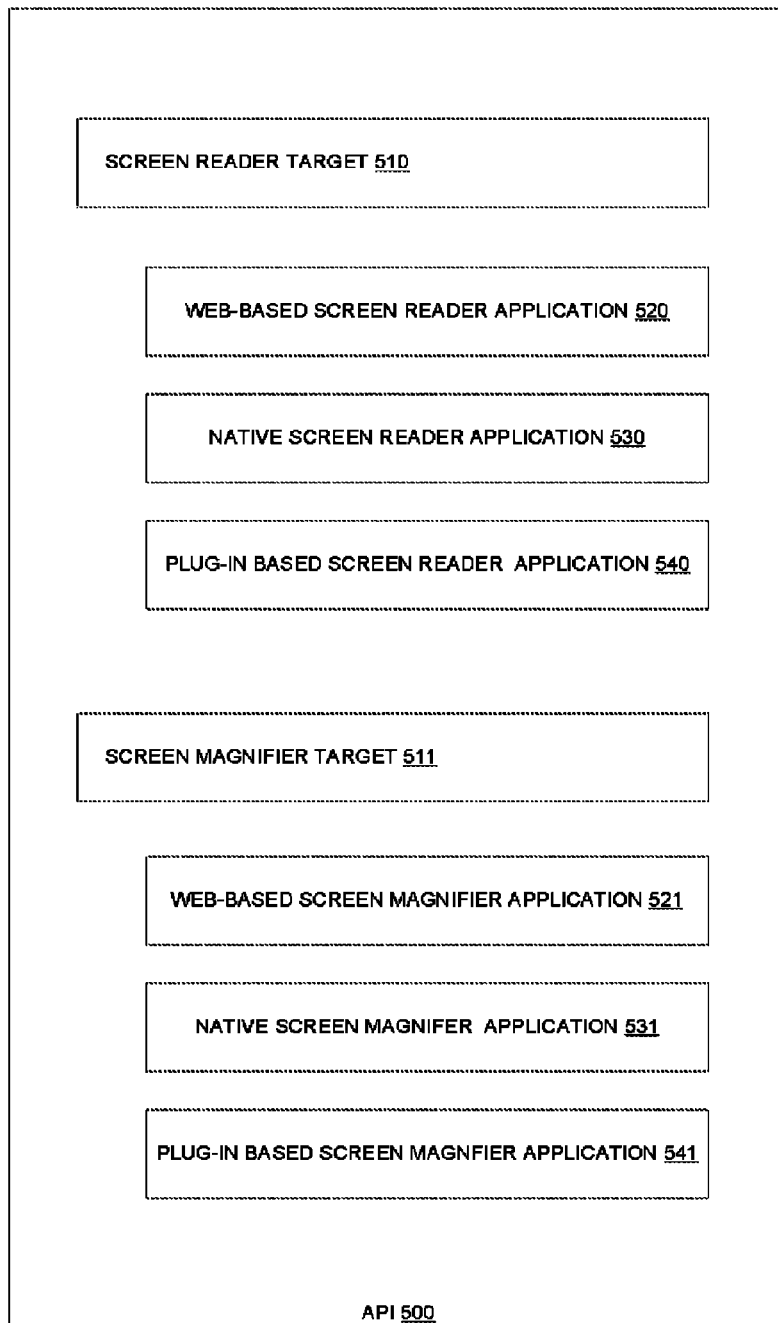
FIG. 5 is a schematic diagram showing an exemplary plug-in based API for an AUI that allows content based navigation and functionality.

FIG. 5 is a schematic diagram showing an exemplary plug-in based API 500 that can be downloaded to and installed on computer 100 to allow computer 100 to configure itself to provide a special needs user with rich content based navigation and functionality as described above. Any of the API's 410-412 shown in FIG. 4 can have the same general structure as the exemplary plug-in 500 shown in FIG. 5, and all of the plug-ins 410-412 can be combined into a single API plug-in 500. As discussed above, event observers and event handlers can detect and respond to events that can expose the rich content and structure of a web page to a special needs user, thereby allowing the user to more easily grasp the structure and content of and to navigate through the page. The event handlers can respond to such events by calling AUI components, either directly or through an API such as API 500, to provide special needs users with requested AUI functionality.

In one implementation, an event handler can call an AUI component through an API 500 that is provided as a browser plug-in. As shown in FIG. 5, API 500 can include targets 510 and 511 that can be called by an event handler to provide AUI functionality to a user. For example, an event handler can call screen reader target 510 to provide screen reader functionality to a blind user or screen magnifier target 511 to provide screen magnifier functionality to a visually impaired user. Other targets are possible, of course, to provide additional AUI functionality to users with different or additional special needs. For example, API 500 can include a target to provide speech recognition functionality to a physically impaired user who cannot enter input commands through a keyboard, mouse or touch-screen device to allow that user to enter vocal input commands.

When an event handler calls a target within API 500, API 500 can direct the call to one or more AUI applications or components that have registered with the API. For example, API 500 can direct an event handler's call to screen reader target 510 to a web-based screen reader application 520, a native screen reader application 530, or a plug-in based screen reader application 530. Similarly, API 500 can direct an event handler's call to screen magnifier target 511 to a web-based screen magnifier application 521, a native screen magnifier application 531, or a plug-in based screen magnifier application 541. API 500 can determine how to direct an event handler's call, for example, based on which AUI applications have registered with API 500, or based on the preference expressed in a user's preference file 144. Thus, if web-based screen magnifier application 521 is the only screen magnifier application that is registered with API 500, API 500 can direct all event handler calls to screen magnifier target 511 to web-based screen magnifier application 521. Similarly, if a user has expressed a preference for a native screen reader application 530, API 500 can direct all event handler calls to screen reader target 510 to the native screen reader application 530.

FIG. 6 is a flow chart of a process for providing a special needs user cloud-enabled access to an augmented user interface. As explained above, when a special needs user successfully logs onto a cloud-enabled computer, the computer automatically sends the user's logon credentials to a remote server that provides a cloud-enabled service. The remote server receives the user's logon credentials (605), and uses them to authenticate the user (610). Upon authenticating the user, the remote server retrieve's the user's preference file from a database (615), and determines from the preference file the user's preference for implementing an augmented user interface, such as a screen reader, on the cloud-enabled computer (620). If the user's preference file indicates a preference for using/implementing an augmented user interface on the cloud-enabled computer, the remote server sends the cloud-enabled computer the information it needs to implement that augmented user interface (625). This information can include, for example, the user's preferences file, a stand alone version of the AUI, a browser plug-in version of the AUI, or an API for a web-passed version of the AUI. The information can also include an API that interfaces with any of the above AUI's, (e.g., native, browser plug-in or web-based), and that allows a user to choose to use any of these AUI components. In one implementation, the remote server downloads an API plug-in to the cloud-enabled computer. The API plug-in allows a web browser running on the cloud-enabled computer to provide AUI functionality to a special needs user. The API plug-in can also allow the user to receive AUI functionality through different AUI components, which may be cloud-based components, native components or browser plug-in components. Moreover, as described above, these AUI components can be sent from the remote server to the cloud-based computer to enable the cloud-based computer to provide the AUI functionality.

The methods described herein may be implemented in digital electronic circuitry, or in computer hardware, firmware, software, or in combinations of them. The methods may implemented as a computer program product, i.e., as a computer program tangibly embodied in a machine-readable storage device for execution by, or to control the operation of, a data processing apparatus such as a programmable processor, a computer, or multiple computers. A computer program can be written in any form of programming language, including a compiled or interpreted language, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network.

Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both. Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks.

Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry such as a FPGA (field programmable gate array) or as an ASIC (application-specific integrated circuit).

To provide for user interaction, the computer may include a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed apparatus and methods may be implemented on a computing system that includes a back-end component, e.g., a data server, or that includes a middleware component, e.g., an application server, or that includes a front-end component, e.g., a client computer having a graphical user interface or a Web browser through which a user can interact with any combination of such back-end, middleware, or front-end components. Components may be interconnected by any form or medium of digital data communication, e.g., a communication network, including a local area network (LAN) and a wide area network (WAN) such as the Internet.

While certain features have been illustrated as described herein, many modifications, substitutions, changes and equivalents will be known to those of skill in the art. It is, therefore, to be understood that the appended claims are intended to cover all such modifications and changes as fall within the scope of the embodiments.

What is claimed is:

1. A computer-implemented method comprising:
   providing an application programming interface running in a web browser on a computer to receive a call from an event handler to process a detected user navigation event on a web page,
   wherein content navigation rules (CNRs) characterize nodes of a document-object-model (DOM) of the web page as a sequence of one or more logical paths through the web page when rendered by the computer, and wherein the CNRs are associated with respective augmented user interface (AUI) functionalities that are tailored to different types of users;
   in response to receiving the call, requesting a user preference file from a remote server;
   receiving, from the remote server, the user preference file and an AUI component API identified in the user preference file; and
   in response to receiving the user preference file:
      processing the detected user navigation event by:
         identifying a CNR corresponding to the detected navigation event; and
         calling, in the web browser, an AUI component application via the received AUI component API to invoke an AUI on the computer, the AUI having the respective AUI functionality associated with the identified CNR.

2. A non-transitory computer-readable storage medium comprising instructions operable to cause a programmable processor to:
   provide an application programming interface running in a web browser on a computer to receive a call from an event handler to process a detected user navigation event on a web page,
   wherein content navigation rules (CNRs) characterize nodes of a document-object-model (DOM) of the web page as a sequence of one or more logical paths through the web page when rendered by the computer, and wherein the CNRs are associated with respective augmented user interface (AUI) functionalities that are tailored to different types of users; and in response to receiving the call, request a user preference file from a remote server;

receive, from the remote server, the user preference file and an AUI component API identified in the user preference file; and in response to receiving the user preference file:
process the detected user navigation event by:
identifying a CNR corresponding to the detected navigation event; and
calling, in the web browser, an AUI component application via the received AUI component API in the web browser to invoke an AUI on the computer, the AUI having the respective AUI functionality associated with the identified CNR.

3. The method of claim 1, wherein the received AUI component API provides the respective AUI functionality on the computer in conjunction with the AUI component application according to the user preference file.

4. The method of claim 3, wherein the AUI component application includes at least one of a cloud-based AUI component application, a native AUI component application or a browser plug-in AUI component application.

5. The method of claim 1, wherein the received AUI component API includes a browser plug-in.

6. The method of claim 1, wherein the received AUI component API includes a target callable by the event handler to call the AUI component application.

7. The method of claim 1, wherein the AUI component application includes one of a native screen reader, a native screen magnifier, a native speech recognizer, a browser plug-in version of a screen reader, a browser plug-in version of a screen magnifier, a browser plug-in version of a speech recognizer, a web based screen reader, a web based screen magnifier and a web based speech recognizer.

8. The non-transitory computer-readable storage medium of claim 2, wherein the received AUI component API provides the respective AUI functionality on the computer in conjunction with the AUI component application according to the user preference file.

9. The non-transitory computer-readable storage medium of claim 8, wherein the AUI component application includes at least one of a cloud-based AUI component application, a native AUI component application or a browser plug-in AUI component application.

10. The non-transitory computer-readable storage medium of claim 2, wherein the received AUI component API includes a browser plug-in.

11. The non-transitory computer-readable storage medium of claim 2, wherein the received AUI component API includes a target callable by the event handler to call the AUI component application.

12. The non-transitory computer-readable storage medium of claim 2, wherein the AUI component application includes one of a native screen reader, a native screen magnifier, a native speech recognizer, a browser plug-in version of a screen reader, a browser plug-in version of a screen magnifier, a browser plug-in version of a speech recognizer, a web based screen reader, a web based screen magnifier and a web based speech recognizer.

* * * * *